(12) United States Patent
Olin et al.

(10) Patent No.: US 11,796,330 B2
(45) Date of Patent: Oct. 24, 2023

(54) SYSTEM AND METHOD FOR PROVIDING VALUE RECOMMENDATIONS TO RIDE-HAILING DRIVERS

(71) Applicant: DELPHI TECHNOLOGIES IP LIMITED, St. Michael (BB)

(72) Inventors: Peter M. Olin, Ann Arbor, MI (US); John E. Kirwan, Troy, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 386 days.

(21) Appl. No.: 16/787,389

(22) Filed: Feb. 11, 2020

(65) Prior Publication Data

US 2021/0247195 A1 Aug. 12, 2021

(51) Int. Cl.
  *G01C 21/34* (2006.01)
  *G01C 21/36* (2006.01)

(52) U.S. Cl.
  CPC ..... *G01C 21/3438* (2013.01); *G01C 21/3461* (2013.01); *G01C 21/3484* (2013.01); *G01C 21/3492* (2013.01); *G01C 21/3605* (2013.01)

(58) Field of Classification Search
  CPC ........... G01C 21/3605; G01C 21/3461; G01C 21/3438; G01C 21/3492; G01C 21/3484
  See application file for complete search history.

(56) References Cited

U.S. PATENT DOCUMENTS

| 7,802,724 | B1 | | 9/2010 | Nohr | |
| 10,511,971 | B1 | * | 12/2019 | Akpinar | .............. H04W 12/084 |
| 10,768,621 | B1 | * | 9/2020 | Nix | ..................... G01C 21/3407 |
| 10,846,633 | B2 | * | 11/2020 | Magazinik | ............. G06Q 50/32 |
| 11,015,952 | B1 | * | 5/2021 | Lyle | ....................... G01C 21/367 |
| 11,551,139 | B1 | * | 1/2023 | Finamore | ............... G06Q 50/30 |
| 2005/0071080 | A1 | * | 3/2005 | Sano | ................ G08G 1/096822 |
| | | | | | 701/428 |
| 2006/0161330 | A1 | * | 7/2006 | Lupo | .................... G01N 27/122 |
| | | | | | 701/93 |

(Continued)

FOREIGN PATENT DOCUMENTS

| CN | 109118758 A | * | 1/2019 | ........... G08G 1/0116 |
| WO | WO-2016054700 A1 | * | 4/2016 | ............. G06Q 10/02 |

*Primary Examiner* — Angelina Shudy
(74) *Attorney, Agent, or Firm* — Dickinson Wright PLLC

(57) ABSTRACT

A method for providing ride-hailing recommendations to an operator includes receiving at least a first initial ride-hailing request and a second initial ride-hailing request from potential ride-hailing users; identifying at least a first route characteristic corresponding to a first route associated with the first initial ride-hailing request; identifying at least a second route characteristic corresponding to a second route associated with the second initial ride-hailing request; calculating a first subsequent ride-hailing request probability; calculating a second subsequent ride-hailing request; determining a first ride-hailing request value based on at least the first route characteristic and the first subsequent ride-hailing request probability; determining a second ride-hailing request value based on at least the second route characteristic and the second subsequent ride-hailing request probability; and displaying the first and second initial ride-hailing requests and the first and second ride-hailing request values.

20 Claims, 7 Drawing Sheets

(56) References Cited

U.S. PATENT DOCUMENTS

| | | | |
|---|---|---|---|
| 2010/0299177 A1* | 11/2010 | Buczkowski | G06Q 10/06311; 705/7.13 |
| 2013/0054125 A1* | 2/2013 | Bruemmer | B25J 9/08; 701/123 |
| 2013/0096827 A1* | 4/2013 | McCall | G06Q 10/047; 701/533 |
| 2013/0204656 A1* | 8/2013 | Mahfouda | G06Q 10/06316; 705/7.26 |
| 2013/0246219 A1* | 9/2013 | Mishanski | G06Q 30/00; 705/26.9 |
| 2013/0261970 A1* | 10/2013 | Papajewski | G01C 21/3492; 701/540 |
| 2014/0067488 A1* | 3/2014 | James | G06Q 30/02; 705/13 |
| 2015/0142484 A1* | 5/2015 | Huang | G06Q 50/30; 705/7.11 |
| 2016/0048804 A1* | 2/2016 | Paul | G06Q 10/08355; 705/338 |
| 2016/0307287 A1* | 10/2016 | Jat | G01C 21/3438 |
| 2016/0321566 A1* | 11/2016 | Liu | G05D 1/0011 |
| 2016/0321771 A1* | 11/2016 | Liu | G06Q 30/0283 |
| 2016/0364823 A1* | 12/2016 | Cao | G06Q 10/1095 |
| 2017/0012920 A1* | 1/2017 | Chheda | H04L 51/066 |
| 2017/0146362 A1* | 5/2017 | Bai | G01C 21/3492 |
| 2017/0243172 A1* | 8/2017 | Dayama | G01C 21/3438 |
| 2017/0261991 A1* | 9/2017 | Raghu | B60W 30/00 |
| 2017/0262790 A1* | 9/2017 | Khasis | G08G 1/012 |
| 2017/0300511 A1* | 10/2017 | Brewington | G06F 16/29 |
| 2017/0314948 A1* | 11/2017 | Racah | G01C 21/28 |
| 2017/0356749 A1* | 12/2017 | Shelby | G01C 21/3407 |
| 2018/0025407 A1* | 1/2018 | Zhang | G06Q 10/02; 705/26.81 |
| 2018/0134400 A1* | 5/2018 | Knapp | B64C 11/001 |
| 2018/0143033 A1* | 5/2018 | Hu | G01C 21/3617 |
| 2018/0211218 A1* | 7/2018 | Berdinis | G06Q 10/08345 |
| 2018/0231984 A1* | 8/2018 | Alonso-Mora | G05D 1/0291 |
| 2019/0092171 A1* | 3/2019 | Netzer | H04W 4/40 |
| 2019/0156670 A1* | 5/2019 | O'Sullivan | G06Q 10/063112 |
| 2019/0180404 A1* | 6/2019 | Park | G06Q 50/30 |
| 2019/0210610 A1* | 7/2019 | Takeuchi | G01C 21/26 |
| 2019/0244518 A1* | 8/2019 | Cheng | G08G 1/0145 |
| 2019/0311453 A1* | 10/2019 | Schneider | G06Q 10/06315 |
| 2020/0011687 A1* | 1/2020 | Lindemann | G07C 5/02 |
| 2020/0033148 A1* | 1/2020 | Singh | G01C 21/3438 |
| 2020/0062126 A1* | 2/2020 | Duan | G05D 1/0223 |
| 2020/0104965 A1* | 4/2020 | Ramot | G06Q 10/06315 |
| 2020/0116510 A1* | 4/2020 | Hori | G01C 21/3438 |
| 2020/0122588 A1* | 4/2020 | Cserna | B60L 58/12 |
| 2020/0216066 A1* | 7/2020 | Aggoune | B60W 40/04 |
| 2020/0240803 A1* | 7/2020 | Rao | G01C 21/3679 |
| 2020/0240804 A1* | 7/2020 | Rao | G06Q 10/047 |
| 2020/0286199 A1* | 9/2020 | Maddipati | G01C 21/3438 |
| 2020/0309552 A1* | 10/2020 | Palande | G01C 21/3617 |
| 2020/0393259 A1* | 12/2020 | Gantt, Jr. | B60L 53/65 |
| 2021/0061306 A1* | 3/2021 | Dagan | H04W 4/40 |
| 2021/0201393 A1* | 7/2021 | Tang | G06Q 30/0206 |
| 2021/0213932 A1* | 7/2021 | Aggoune | B60W 20/12 |
| 2021/0217313 A1* | 7/2021 | Hirose | G08G 1/202 |
| 2021/0262812 A1* | 8/2021 | Yang | G06Q 30/08 |
| 2021/0285777 A1* | 9/2021 | Ostadzadeh | G01C 21/3617 |
| 2023/0075033 A1* | 3/2023 | Zhang | G01C 21/3438 |
| 2023/0139003 A1* | 5/2023 | Bhasme | B60L 15/2045; 701/533 |

* cited by examiner

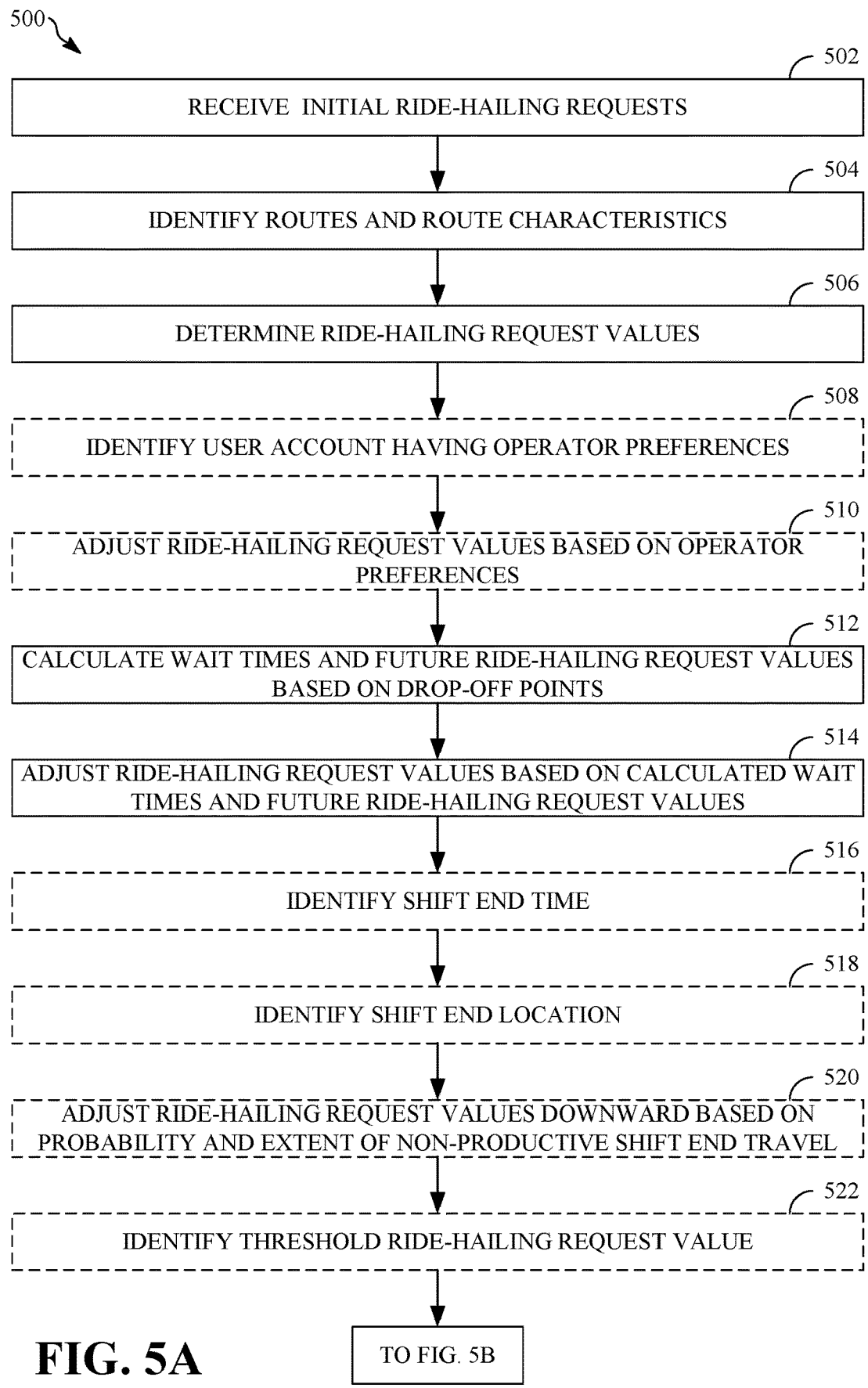

SYSTEM AND METHOD FOR PROVIDING VALUE RECOMMENDATIONS TO RIDE-HAILING DRIVERS

TECHNICAL FIELD

This disclosure relates to ride-hailing applications, and in particular to systems and methods for providing value recommendations to ride-hailing drivers.

BACKGROUND

Ride-hailing, or ride-sharing, services are increasingly becoming ubiquitous with everyday transportation. Ride-hailing (e.g., or ride-sharing) refers to a service wherein a traveler or customer generally requests a ride from a pick-up location to a destination location. Typically, a vehicle and an operator or, in the cause of an autonomous vehicle, simply the vehicle, meet the customer at the pick-up location and transport the customer to the destination location. Such services generally allow the customer to request the ride using a ride-hailing application (e.g., on a mobile device or other suitable computing device).

Typically, the operator of the vehicle uses various ride-hailing applications to identify customers and fares. In general, ride-hailing operators are often presented with limited information about multiple available fares. For example, the operator may be provided with a pick-up location, drop-off location, and a value for the fare. The ride-hailing operator may then select from the available fares based on that information.

SUMMARY

This disclosure relates generally to ride-hailing operator recommendations.

An aspect of the disclosed embodiments is a method for providing ride-hailing recommendations to an operator. The method includes receiving at least a first initial ride-hailing request and a second initial ride-hailing request from potential ride-hailing users. The method further includes identifying, for the first initial ride-hailing request, at least a first route characteristic corresponding to a first route associated with the first initial ride-hailing request. The method further includes identifying, for the second initial ride-hailing request, at least a second route characteristic corresponding to a second route associated with the second initial ride-hailing request. The method further includes calculating a first subsequent ride-hailing request probability based on a first drop-off location corresponding to the first initial ride-hailing request. The method further includes calculating a second subsequent ride-hailing request probability based on a second drop-off location corresponding to a second initial ride-hailing request. The method further includes determining, for the first initial ride-hailing request, a first ride-hailing request value based on at least the first route characteristic and the first subsequent ride-hailing request probability. The method further includes determining, for the second initial ride-hailing request, a second ride-hailing request value based on at least the second route characteristic and the second subsequent ride-hailing request probability. The method further includes displaying the first and second initial ride-hailing requests and the first and second ride-hailing request values.

Another aspect of the disclosed embodiments is a system for presenting fare recommendations to a ride-hailing driver. The system includes a processor, a display; and a memory including instructions that, when executed by the processor, cause the processor to receive initial ride-hailing requests from potential ride-hailing users. The instructions further cause the processor to identify, for the initial ride-hailing requests, routes and at least a respective one route characteristic associated with each of the initial ride-hailing requests. The instructions further cause the processor to determine ride-hailing request values for the initial ride-hailing requests based on the at least one route characteristic associated with each of the initial ride-hailing requests. The instructions further cause the processor to calculate wait times and future ride-hailing request values based on drop-off locations associated with the initial ride-hailing requests. The instructions further cause the processor to adjust the ride-hailing request values based on the wait times and future ride-hailing request values. The instructions further cause the processor to display the initial ride-hailing requests and the ride-hailing request values.

Another aspect of the disclosed embodiments is a non-transitory computer-readable storage medium. The non-transitory computer-readable storage medium includes executable instructions that, when executed by a processor, facilitate performance of operations. The instructions include receiving initial ride-hailing requests from potential ride-hailing users. The instructions further include identifying, for the initial ride-hailing requests, routes and at least a respective one route characteristic associated with each of the initial ride-hailing requests. The instructions further include determining ride-hailing request values for the initial ride-hailing requests based on the at least one route characteristic associated with each of the initial ride-hailing requests. The instructions further include calculating wait times and future ride-hailing request values based on drop-off locations associated with the initial ride-hailing requests. The instructions further include adjusting the ride-hailing request values based on the wait times and future ride-hailing request values. The instructions further include displaying the initial ride-hailing requests and the ride-hailing request values.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 5A and 5B generally illustrate another method for providing a ride-hailing recommendation to an operator according to the principles of the present disclosure.

DETAILED DESCRIPTION

Figure 1:
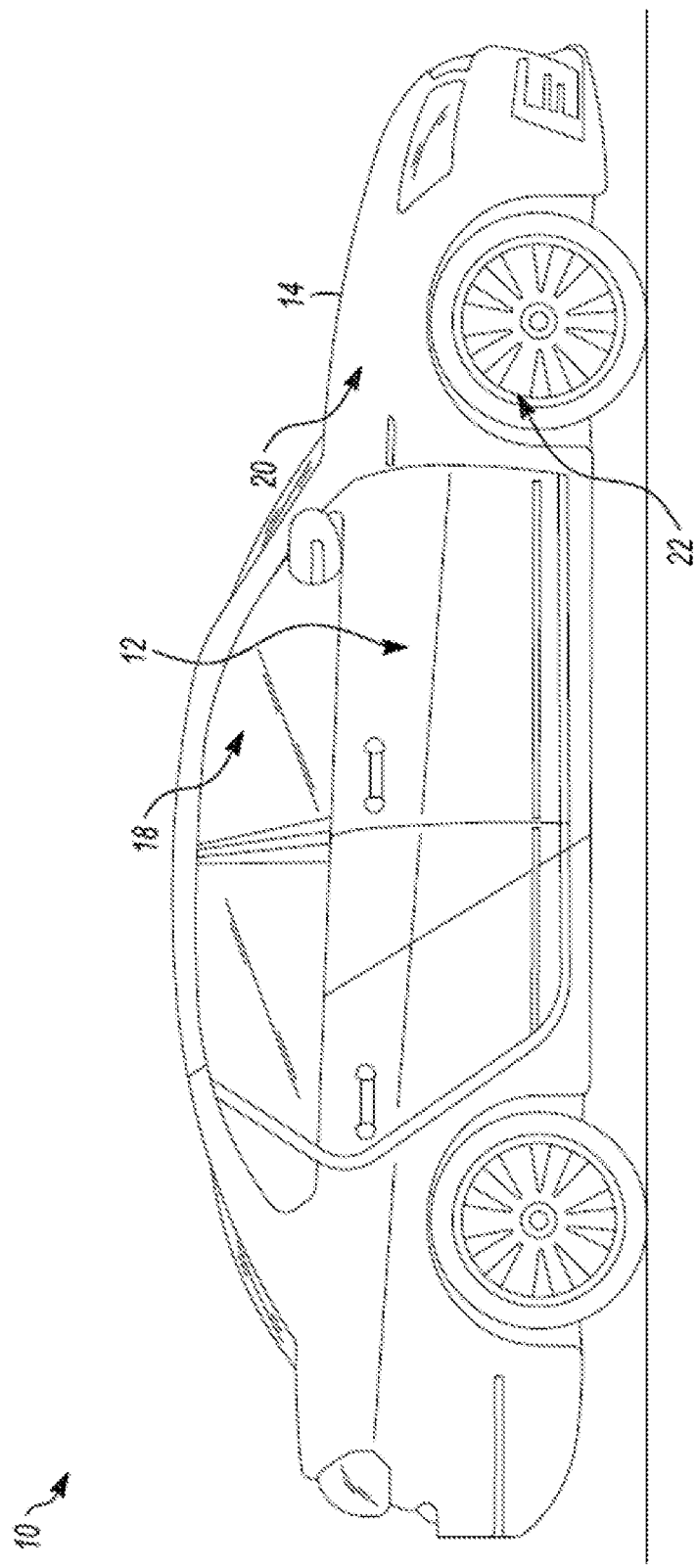
FIG. 1 generally illustrates a vehicle according to the principles of the present disclosure.

The following discussion is directed to various embodiments of the invention. Although one or more of these embodiments may be preferred, the embodiments described should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Ride-hailing or ride-sharing services are increasingly becoming ubiquitous with everyday transportation. Ride-hailing (e.g., or ride-sharing) refers to a service wherein a traveler or customer generally requests a ride from a pick-up location to a destination location. Typically, a vehicle and an operator meet the customer at the pick-up location and transport the customer to the destination location. The operator may include a local (e.g., within the vehicle) human operator of a vehicle, an autonomous system of a vehicle, a remote human operator of remotely controlled or operated vehicle, a remote computer operator of remotely controlled or operated autonomous vehicle, other suitable operator, or any combination thereof. Such services generally allow the customer to request the ride using a ride-hailing application (e.g., on a mobile device or other suitable computing device).

Typically, the operator of the vehicle uses various ride-hailing applications to identify customers and fares. In general, ride-hailing operators are often presented with limited information about multiple available fares. For example, the operator may be provided with a pick-up location, drop-off location, and a value for the fare. The ride-hailing operator may then select from the available fares based on that information.

However, such limited information may make it difficult for operators to make fully informed decisions, which may prevent operators from optimizing fare value. Accordingly, systems and methods, such as those described herein, configured to provide ride-hailing operators with value recommendations in order to optimize overall fare revenue and/or value, may be desirable. In some embodiments, the systems and methods described herein may be configured to generate an optimized recommendation indicating a fare to select in order to achieve the highest net value. The systems and methods may be configured to calculate and present, to the operator, an estimate of the value (such as net profit and/or other value) available for each potential fare.

In some embodiments, the systems and methods described herein determine the net value for a particular fare based on the difference between the cost of the fare (picking up and then transporting the customer to the requested destination location), and the net profit from the fare.

In some embodiments, the systems and methods described herein may determine the cost associated with a particular fare based on the cost to drive from the present location to the customer pick-up location, the cost to drive the customer from the pick-up location to the destination location, and a cost associated with the destination location. The systems and methods described herein may be configured to estimate the cost, for a particular customer, to drive to the pick-up location, and to then drive to the destination location, by determining the route that minimizes the time to arrive and evaluating the expected fuel consumption along the determined route based on information about the route characteristics and the vehicle.

In some embodiments, the systems and methods described herein may be configured to determine the cost associated with the destination location based on a density of ride-hailing customers currently within a calibratable distance from the destination location to estimate wait time for the operator before picking up a next customer. In some embodiments, the systems and methods described herein may be configured to determine a density of ride-hailing customers estimated to be within a calibratable distance from the destination location at the predicted arrival time at the destination location to estimate wait time for the operator before picking up a next customer.

In some embodiments, the systems and methods described herein adjust the net value based on a penalty function. In some embodiments, the penalty function may be based on the distance of the destination location from a preferred operational area of a ride hailing operator. In some embodiments, the systems and methods described herein may be configured to estimate unpaid time/distance for the operator to return to his home location at the end of a shift. In some embodiments, the systems and methods described herein sum the costs. In some embodiments, the systems and methods described herein may display the net profit for each potential customer presented to the operator.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine.

The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or described herein.

Figure 2:
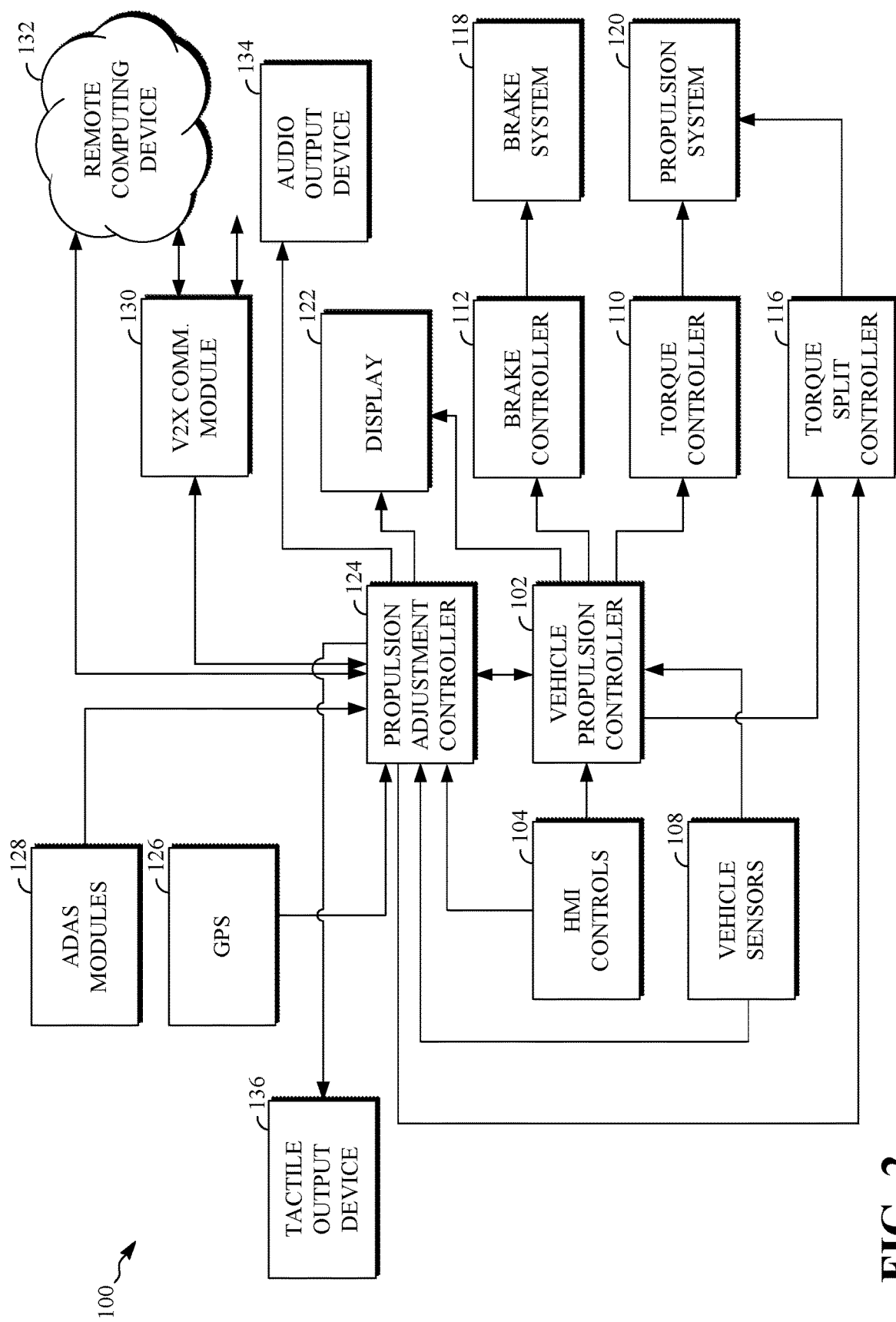
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiments, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the operator. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communicate with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the system 100 may include an audio output device 134. The audio output device 134 may include speakers, chimes, other suitable audio output devices, or a combination thereof. The audio output device 134 may be configured to selectively communicate audible signals to the operator of the vehicle 10 to indicate various information, as will be described. In some embodiments, the vehicle 10 includes a tactile output device 136, such as a vibration motor or other suitable tactile output device. The tactile output device 136 may be disposed in a vehicle seat, such as the operator seat, the steering wheel, or another suitable location within the vehicle 10. The tactile output device 136 may be configured to provide a tactile output to the operator of the vehicle 10 to indicate various information, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 may be in communication with one or more human to machine interface (HMI) controls 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the operator of the vehicle 10 may interface with the HMI controls 104 to use the VPC 102 to control vehicle propulsion and/or other features of the VPC 102. For example, the operator may actuate an HMI switch of the HMI controls 104 disposed on the steering wheel of the vehicle 10. The HMI controls 104 may communicate a signal to the VPC 102.

In some embodiments, the VPC 102 may be in communication with a transmission controller module (TCM) (not shown). The VPC 102 may receive information from the TCM (e.g., an automatically selected gear) and may determine and/or adjust the total torque demand based on the information received from the TCM.

As described, the system 100 may include a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. The PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 may receive route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module may be disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms.

The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the operator of the vehicle 10 to improve vehicle safety and road safety. The ADAS modules 128 may be configured to automate and/or adapt and enhance vehicle systems for safety and better driving. The ADAS modules 128 may be configured to alert the operator of the vehicle 10 of upcoming traffic conditions or disabled vehicles and/or to alert the vehicle 10 of a vehicle proximate to the vehicle 10 in order to avoid collisions and accidents. The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X communication module 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, manufacturer provided energy consumption efficiency of the vehicle 10, a weight of the vehicle 10, other vehicle parameters, or a combination thereof. Some or all of the vehicle parameters received may be based on the make of the vehicle, the model of the vehicle, the VIN of the vehicle, any other suitable information, or a combination thereof. For example, in some embodiments, the operator or the PAC 124 provides the VIN of the vehicle, the make of the vehicle, and/or model of the vehicle, to the remote computing device 132, and the remote computing device 132 transmits the vehicle parameters to the PAC 124 based on the VIN, the make of the vehicle, the model of the vehicle, or any combination thereof.

In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the operator of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the operator of the vehicle 10. For example, the operator may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the operator may provide route characteristics, such as a route map, route distance, other route characteristics, or a combination thereof, to the PAC 124. In some embodiments, the PAC 124 learns behavior of the operator of the vehicle 10. For example, the PAC 124 monitors the vehicle speed relative to posted speed limits or whether the operator implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the operator of the vehicle 10 with a recommended vehicle speed. In some embodiments, the VPC 102 may include an adaptive cruise control mechanism. As described, the adaptive cruise control mechanism is configured to maintain the desired vehicle speed provided by the operator of the vehicle 10 using the HMI controls 104, and the adaptive cruise control mechanism is configured to maintain a safe distance between the vehicle 10 and a lead vehicle.

The adaptive cruise control mechanism is configured to bring the vehicle 10 to a complete stop in response to the lead vehicle coming to a complete stop. Additionally, or alternatively, the adaptive cruise control mechanism is incapable of bringing the vehicle 10 to a complete stop in the absence of a lead vehicle. Accordingly, the VPC 102 (e.g., the adaptive cruise control mechanism) cannot take advantage of energy efficient vehicle propulsion control (e.g., such as a coasting to a stop in response to a determination that vehicle 10 is approaching a stop sign). The PAC 124 is configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof.

The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 may be configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle energy consumption profile to identify a vehicle speed profile (within a threshold range of the desired vehicle speed provided by the operator to the VPC 102) and/or a torque split profile having an optimum energy consumption over the grade variation of the portion of the route being traversed by the vehicle.

In some embodiments, the PAC 124 may determine the vehicle speed and torque split profiles using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate updated profiles for target vehicle speeds and/or target torque splits, such that, the vehicle 10 maintains an optimum or improved energy consumption while maintaining operator and/or passenger comfort (e.g., by avoiding sudden, unnecessary changes in vehicle speed).

In some embodiments, the PAC 124 may communicate with the display 122 to provide indicators to the operator. For example, the PAC 124 may use the display 122 to illustrate an energy efficiency symbol that indicates to the operator of the vehicle 10 that the vehicle speed is changing in order to improve energy consumption efficiency of the vehicle 10.

Accordingly, the PAC 124 is configured to provide a recommendation to the operator indicating a target vehicle speed of a target vehicle speed profile. The recommendation may be provided to the operator of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the operator of the vehicle 10 using a mobile computing device within the vehicle 10.

The recommendation may include a symbol or textual information that indicates to the operator of the vehicle 10 to increase or decrease vehicle speed. Additionally, or alternatively, the recommendation may include a coast recommendation that is displayed for a calibratable amount of time and is then withdrawn in response to the operator of the vehicle 10 ignoring the recommendation. The recommendation may include information indicating that the recommendation is in response to a change in speed limit, a stop sign being approached by the vehicle 10, traffic signal timing, and status, or other information. The information may be visually displayed and may decay as the vehicle 10 recommendation becomes obsolete.

In some embodiments, the PAC 124 and/or the VPC 102 may perform the methods described herein. However, the methods described herein as performed by the PAC 124 and/or the VPC 102 are not meant to be limiting, and any type of software executed on a controller may perform the methods described herein without departing from the scope of this disclosure. For example, a controller, such as a processor executing software within a computing device onboard the vehicle 10, may perform the methods described herein.

Figure 3:
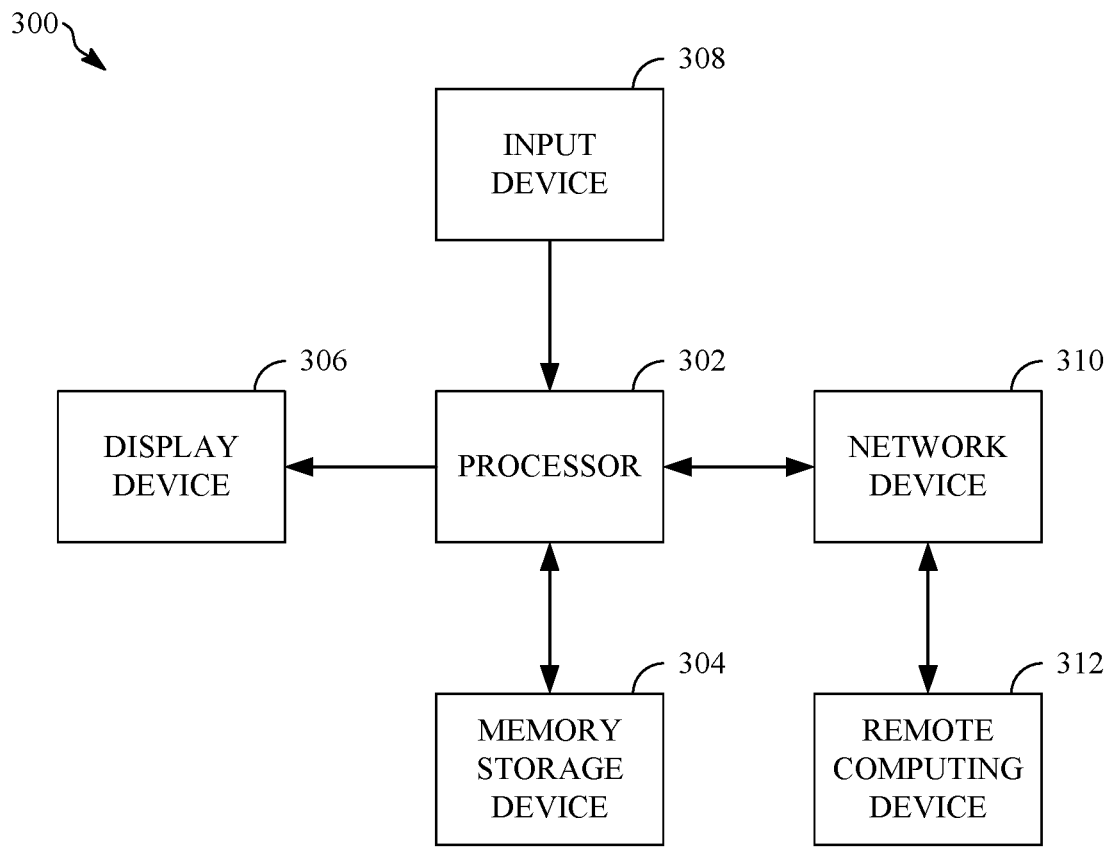
FIG. 3 generally illustrates a block diagram of a system for providing a ride-hailing recommendation to an operator.

FIG. 3 generally illustrates a block diagram of a system 300 for providing a ride-hailing recommendation to an operator. In some embodiments, the system 300 may include a processor 302 according to principles of the disclosure. The processor 302 may be disposed in a vehicle. The processor 302 may be disposed in a mobile device, such as a smartphone or tablet. In some embodiments, the system 300 may include a memory storage device 304 in communication with the processor 302. The memory storage device 304 may be a hard-disc memory device, a solid state memory device, ROM, RAM, or any other suitable memory storage device. The memory storage device 304 may include instructions that cause the processor 302 to perform certain operations. In some embodiments, the system 300 may include a display device 306 in communication with the processor 302. The display device 306 may be disposed in a vehicle, such as on the dash or console of the vehicle.

The display device 306 may be disposed in a mobile computing device, such as a smartphone tablet, or other suitable mobile computing. The display device 306 may include a screen, a touchscreen, or any other suitable display device. In some embodiments, the system 300 may include an input device 308 in communication with the processor 302. The input device 308 may include a keyboard, a microphone, a touch screen, or any other suitable input device. In some embodiments, the processor 302 may be connected to a network device 310 to communicate with a remote computing device 312. The network device 310 may be a wired or wireless device or adapter or any suitable network device.

In some embodiments, the methods herein are performed on the system 300 as described herein. In some embodiments, the processor 302 and/or the remote computing device 312 may perform the methods described herein. In some embodiments, the methods are performed on the system 100 as described herein. However, the methods described herein as performed by the system 100 or the system 300 are not meant to be limiting, and any type of software executed on a controller may perform the methods described herein without departing from the scope of this disclosure. In some embodiments, instructions to perform the methods described herein may be stored on non-transitory computer-readable storage media.

The methods herein may include additional or fewer steps or processes than those described. The steps and processes of the methods described herein may be performed in any suitable order, and are not intended to be limited by the order in which the steps and processes are presented.

Figure 4A:
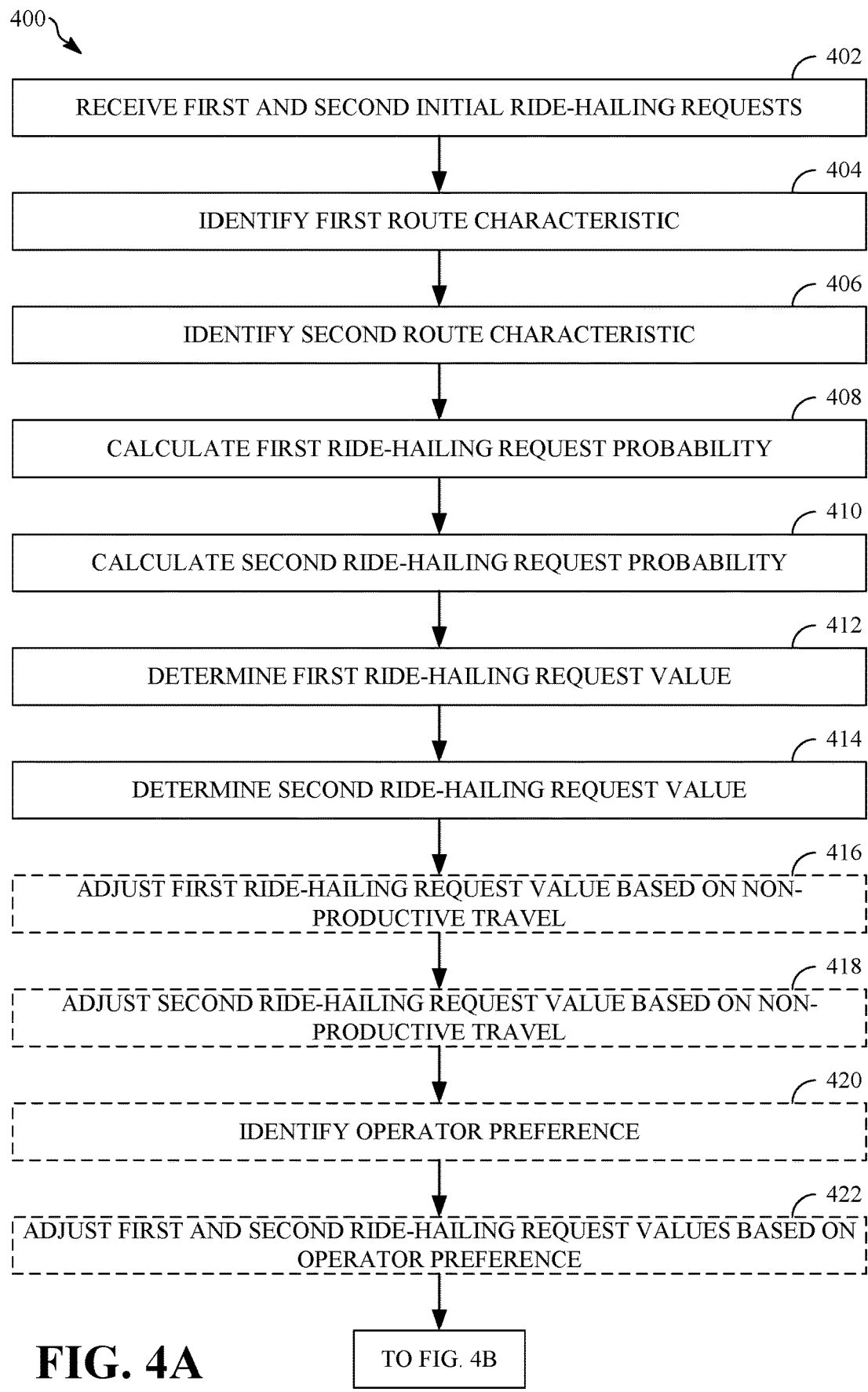
FIGS. 4A and 4B generally illustrate a method for providing a ride-hailing recommendation to an operator according to the principles of the present disclosure.
Figure 4B:
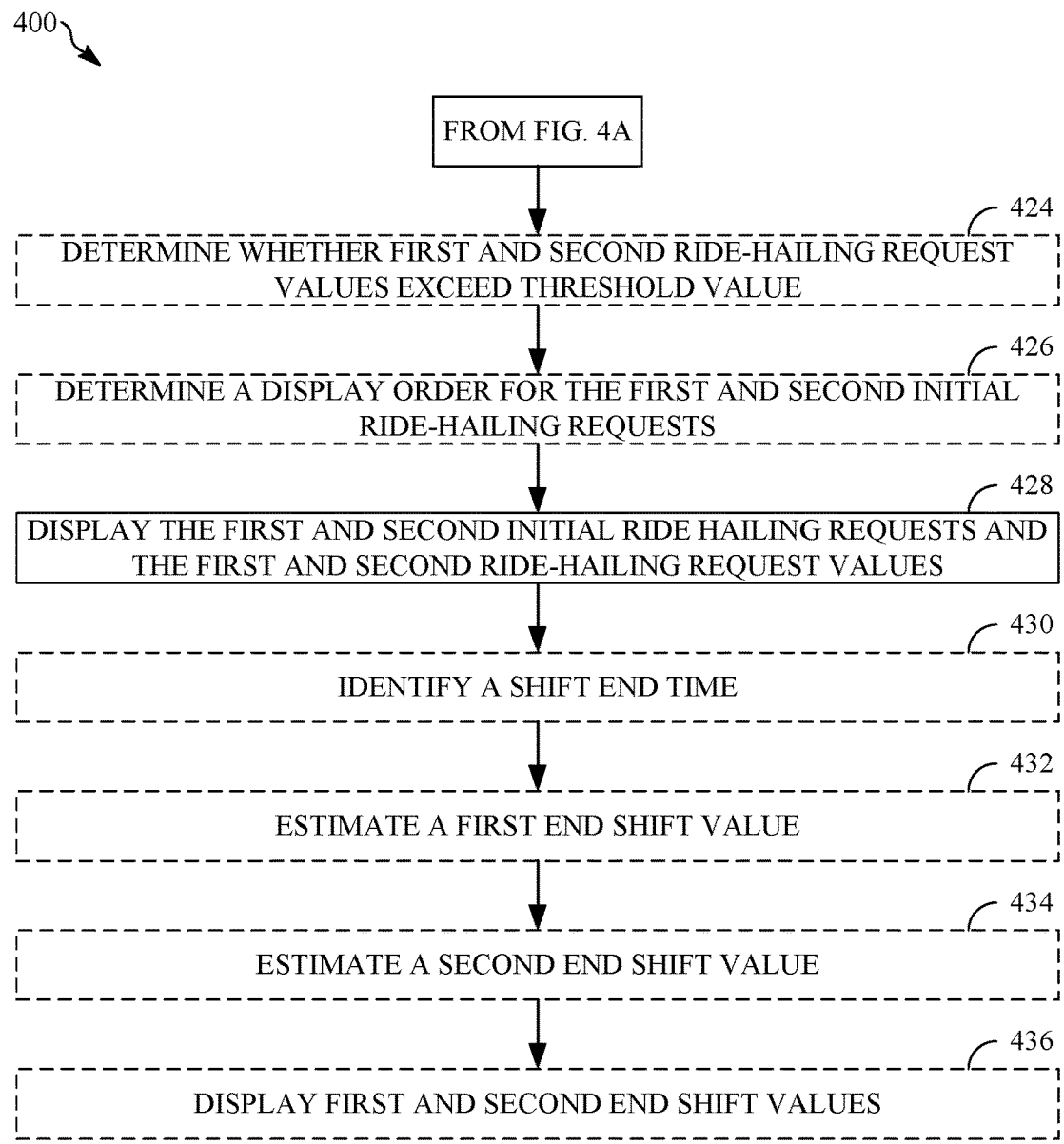

FIGS. 4A and 4B show a flow diagram generally illustrating a method 400 of producing a recommendation for a ride-hailing operator. The operator can include a ride-hailing operator. The operator can include an autonomous ride-hailing vehicle. The operator can include a supervisor of an autonomous ride-hailing vehicle.

At 402, the method 400 receives at least a first initial ride-hailing request and a second initial ride-hailing request from potential ride-hailing users. For example, the processor 302 may receive a first initial ride-hailing request and a second initial ride-hailing request sent by the remote computing device 312.

At 404, the method 400 identifies, for the first initial ride-hailing request, at least a first route characteristic corresponding to a first route associated with the first initial ride-hailing request. For example, the processor 302 may identify the first route characteristic received from the remote computing device 312 via the network device 310. In some embodiments, the first route characteristic may be selected from a group including current traffic conditions, future traffic conditions, road grade, speed limits, drop-off location, pick-up location, and distance to pick-up location, and distance between pick-up location and drop-off location. In some embodiments, more than one route characteristic may be received.

At 406, the method 400 identifies, for the second initial ride-hailing request, at least a second route characteristic corresponding to a second route associated with the second initial ride-hailing request. For example, the processor 302 may identify the second route characteristic received from the remote computing device 312 via the network device 310. In some embodiments, the second route characteristic may be selected from a group including current traffic conditions, future traffic conditions, road grade, speed limits, drop-off location, pick-up location, and distance to pick-up location, and distance between pick-up location and drop-off location. In some embodiments, more than one route characteristic may be received.

At 408, the method 400 calculates a first subsequent ride-hailing request probability based on a first drop-off location corresponding to the first initial ride-hailing request. For example, the processor 302 may use historical ride-hailing information associated with the drop-off location at the time of day and day of the week when the ride-hailing operator would likely reach the drop off location to calculate the first subsequent ride-hailing request probability. The calculation could include running a simulation based on historical trips to determine the probability. The calculation could be based on known event information (i.e. there is a game starting at 7:00 PM between two major football teams at a specific stadium). The calculation could be based on current ride-hailing requests at the drop-off location. The calculation could be based on population density at the drop-off location. The probability could also include probable future route characteristics.

At 410, the method 400 calculates a second subsequent ride-hailing request probability based on a second drop-off location corresponding to second initial ride-hailing request. For example, the processor 302 may use historical ride-hailing information associated with the drop-off location at the time of day and day of the week when the ride-hailing operator would likely reach the drop off location to calculate the second subsequent ride-hailing request probability. The calculation could include running a simulation based on historical trips to determine the probability. The calculation could be based on known event information (i.e. there is a game starting at 7:00 PM between two major football teams at a specific stadium). The calculation could be based on current ride-hailing requests at the drop-off location. The calculation could be based on population density at the drop-off location. The probability could also include probable future route characteristics.

At 412, the method 400 determines, for the first initial ride-hailing request, a first ride-hailing request value based on at least the first route characteristic and the first subsequent ride-hailing request probability. For example, the processor 302 may calculate the first ride-hailing request value based on the travel distance required (as an example of the first route characteristic) and the first subsequent ride-hailing request probability. The calculation may be based on the fare amount. The calculation may be based on the amount of time required for the fare (as another example of the first route characteristic). The calculation may be based on a projected energy usage (and cost thereof) for the route (i.e. gallons of fuel or kWh of electricity and cost thereof as calculated based on known characteristics of the route and the vehicle). The calculation may be based on a depreciation curve for the vehicle, itself being based on the travel distance required. The calculation may be based on a probability of a collision for the vehicle (based on known route characteristics, vehicle characteristics, and/or operator history). The calculation may be based on a probability of damage to the vehicle (based on known route characteristics, vehicle characteristics, and/or operator history). The calculation may be based any suitable probability or characteristics other than those described herein. In some embodiments, the first ride-hailing request values is given as value per unit time. In some embodiments, the first ride-hailing request values is given in currency units (i.e. dollars). In some embodiments, the first ride-hailing request values is given in currency units per unit time (i.e. dollars per hour).

At 414, the method 400 determines, for the second initial ride-hailing request, a second ride-hailing request value based on at least the second route characteristic and the second subsequent ride-hailing request probability. For example, the processor 302 may calculate the second ride-hailing request value based on the travel distance required (as an example of the second route characteristic) and the second subsequent ride-hailing request probability. The calculation may be based on the fare amount. The calculation may be based on the amount of time required for the fare (as another example of the second route characteristic). The calculation may be based on a projected energy usage (and cost thereof) for the route (i.e. gallons of fuel or kWh of electricity and cost thereof as calculated based on known characteristics of the route and the vehicle). The calculation may be based on a depreciation curve for the vehicle, itself being based on the travel distance required. The calculation may be based on a probability of a collision for the vehicle (based on known route characteristics, vehicle characteristics, and/or operator history). The calculation may be based on a probability of damage to the vehicle (based on known route characteristics, vehicle characteristics, and/or operator history) and/or any suitable probability or characteristic other than those described herein. In some embodiments, the second ride-hailing request values is given as value per unit time. In some embodiments, the second ride-hailing request values is given in currency units (i.e. dollars). In some embodiments, the second ride-hailing request values is given in currency units per unit time (i.e. dollars per hour).

At 416, the method may adjust the first ride-hailing request value based on an estimated amount of non-productive travel associated with the first initial ride-hailing request. For example, the processor 302 may estimate that accepting the first initial ride-hailing request would result in an operator, at the end of the operator's shift, having to travel to a home location for 15 miles taking an estimated 30 minutes, and then adjust the first ride-hailing request value downward on that basis.

At 418, the method 400 may adjust the second ride-hailing request values based on an estimated amount of non-productive travel associated with the second initial ride-hailing request. For example, the processor 302 may estimate that accepting the second initial ride-hailing request would result in an operator, at the end of the operator's shift, having to travel to a home location for 15 miles taking an estimated 30 minutes, and then adjust the second ride-hailing request value downward on that basis.

At 420, the method 400 may identify, for the operator, at least one operator preference. For example, the processor 302 may receive an operator preference that the operator prefers highway driving to city driving from the memory storage device 304 or the remote computing device 312 by way of the network device 310. Other examples of operator preferences include, but are not limited to, areas of operation, end of shift time, other suitable probabilities or characteristics, or a combination thereof.

At 422, the method 400 may adjust the first and second ride-hailing request values based on the at least one operator preference. For example, the processor 302 may adjust the first ride-hailing request value upward on the basis that 90% of the route is highway driving, and the second ride-hailing request value downward on the basis that 10% of the route is highway driving.

At 424, the method 400 may determine whether the first and second ride hailing request values are each greater than a threshold. For example, the processor 302 may determine that a threshold value, stored on the memory storage device 304 or received from the remote computing device 312 has been exceeded for the first ride-hailing request value, but not the second ride-hailing request value. The threshold value may be based on an operator preference. The threshold value may change based on location. The threshold value may change based on time of day or day of week. The threshold value may rise based on the number of initial ride-hailing requests available (in order to limit the amount of initial ride-hailing requests displayed, as discussed later).

At 426, the method 400 may determine a display order of the first and second initial ride-hailing requests based on the at least one operator preference, wherein displaying the first and second initial ride-hailing requests and the first and second ride-hailing request values includes displaying the first and second initial ride-hailing requests and the first and second ride-hailing request values based on the display order. For example, the processor 302 may determine, based on an operator preference to display the closest fare first, that the first initial ride-hailing request (e.g., having a pick-up location 0.4 miles away) should be displayed before the second initial ride-hailing request (e.g., having a pick-up location 0.9 miles away).

At 428, the method 400 displays the first and second initial ride-hailing requests and the first and second ride-hailing request values. For example, the processor 302 sends an instruction to have the display device 306 display the first and second initial ride-hailing requests and the first and second ride-hailing request values. In some embodiments, the processor 302 may instruct the display device 306 to display only the initial ride-hailing requests in response to the ride-hailing request values exceeding the threshold. In some embodiments, the processor 302 may instruct the display device 306 to display the first and second initial ride-hailing requests in the display order.

At 430, the method 400 may identify a shift end time. For example, the operator may input, at the input device 308, and the processor 302 may receive, a shift end time of 9:30 PM.

At 432, the method 400 may estimate a first shift end value based on the shift end time and the first ride-hailing request value. For example, the processor 302 may calculate future ride-hailing request probabilities, determine future ride-hailing request values, and adjust the future ride-hailing request values. The processor 302 may then determine the first shift end value by extrapolating to the shift end time.

At 434, the method 400 may estimate a second shift end value based on the shift end time and the second ride-hailing request value. For example, the processor 302 may calculate future ride-hailing request probabilities, determine future ride-hailing request values, and adjust the future ride-hailing request values. The processor 302 may then determine the first shift end value by extrapolating to the shift end time.

At 436, the method 400 may display the estimated first and second shift end values. For example, the processor 302 could instruct the display device 306 to show the shift end values next to the respective ride-hailing request values and initial ride-hailing requests.

The method 400 may include more or fewer steps or processes than those discussed above, and the steps or processes may be performed in any suitable order. While first and second ride hailing requests are discussed, three or more ride-hailing requests being considered and displayed is also contemplated.

Figure 5B:
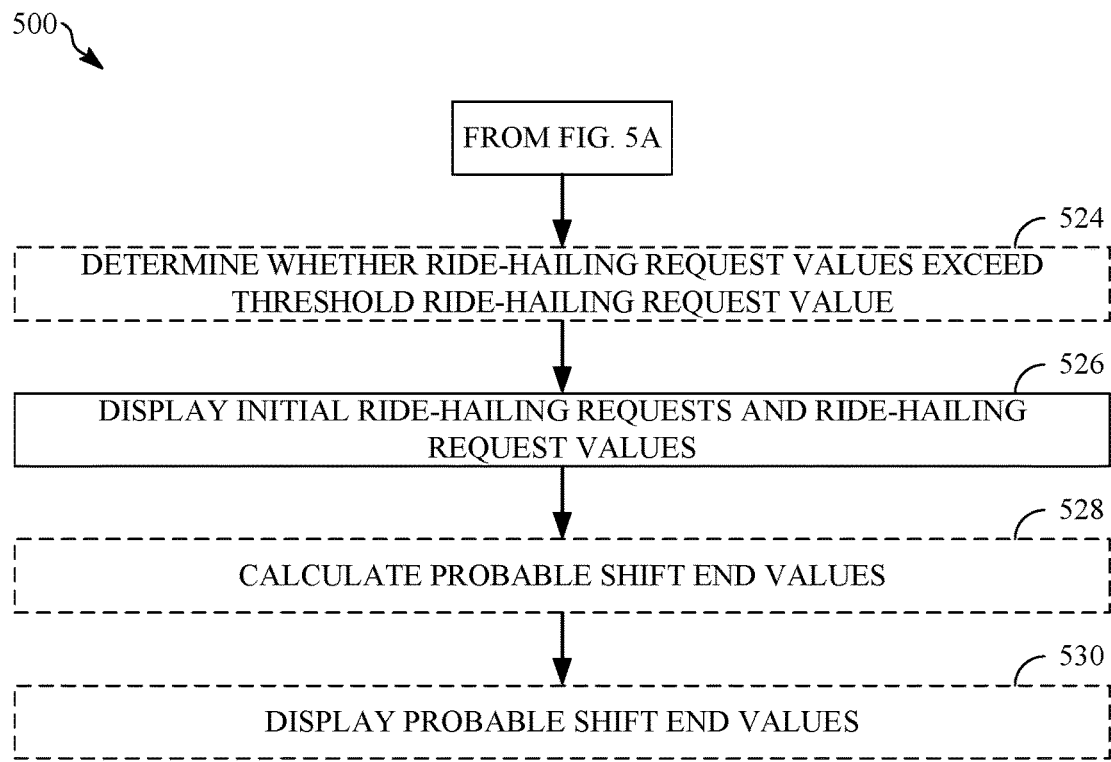

FIGS. 5A and 5B show a flow diagram generally illustrating another method 500 of producing a recommendation for a ride-hailing operator. The operator can include a ride-hailing operator. The operator can include an autonomous ride-hailing vehicle. The operator can include a supervisor of an autonomous ride-hailing vehicle.

At 502, the method 500 receive initial ride-hailing requests from potential ride-hailing users. For example, the processor 302 may receive an initial ride-hailing requests sent by the remote computing device 312 via the network device 310.

At 504, the method 500 identifies, for the initial ride-hailing requests, routes and at least a respective one route characteristic associated with each of the initial ride-hailing requests. For example, the processor 302 or the remote computing device 312 may determine routes required for each of the ride-hailing requests, as well as characteristics of those routes. In some embodiments, the characteristic may be selected from a group including of current traffic conditions, future traffic conditions, road grade, speed limits, drop-off location, pick-up location, and distance to pick-up location, and distance between pick-up location and drop-off location. In some embodiments, more than one route characteristic may be received.

At 506, the method 500 determines ride-hailing request values for the initial ride-hailing requests based on the at least one route characteristic associated with each of the initial ride-hailing requests. For example, the processor 302 may calculate the ride-hailing request values based on the travel distance required (as an example of the route characteristic). The calculation may be based on the fare amount. The calculation may be based on the amount of time required for the fare (as another example of the first route characteristic). The calculation may be based on a projected energy usage (and cost thereof) for the route (i.e. gallons of fuel or kWh of electricity and cost thereof as calculated based on known characteristics of the route and the vehicle). The calculation may be based on a depreciation curve for the vehicle, itself being based on the travel distance required. The calculation may be based on a probability of a collision for the vehicle (based on known route characteristics, vehicle characteristics, and/or operator history). The calculation may be based on a probability of damage to the vehicle (based on known route characteristics, vehicle characteristics, and/or operator history). In some embodiments, the ride-hailing request values are given as value per unit time. In some embodiments, the ride-hailing request values are given in currency units (i.e. dollars). In some embodiments, the ride-hailing request values are given in currency units per unit time (i.e. dollars per hour).

At 508, the method 500 may identify a user account associated with the operator having operator preferences. For example, the processor 302 may receive information about a user account associated with an operator preference that the operator prefers highway driving to city driving from the memory storage device 304 or the remote computing device 312 by way of the network device 310. Other examples of operator preferences include, but are not limited to, areas of operation, end of shift time, any suitable probabilities or characteristics, or a combination thereof.

At 510, the method 500 may adjust the ride-hailing request values based on the operator preferences. For example, the processor 302 may adjust one ride-hailing request value upward on the basis that 90% of the route is highway driving, and another ride-hailing request value downward on the basis that 10% of the route is highway driving.

At 512, the method 500 calculates wait times and future ride-hailing request values based on drop-off locations associated with the initial ride-hailing requests. For example, the processor 302 may use historical ride-hailing information associated with the drop-off location at the time of day and day of the week when the ride-hailing operator would likely reach the drop off location to calculate subsequent ride-hailing request probabilities. The calculation could include running a simulation based on historical trips to determine the probability. The calculation could be based on known event information (e.g., there is a game starting at 7:00 PM between two major football teams at a specific stadium). The calculation could be based on current ride-hailing requests at the drop-off location. The calculation could be based on population density at the drop-off location. The probability could also include probable future route characteristics.

At 514, the method 500 adjusts the ride-hailing request values based on the wait times and future ride-hailing request values. For example, the processor 302 may adjust one ride-hailing request value upward on the basis that there is an expected wait time of only 2 minutes after dropping the customer off at the drop-off location, and another ride-hailing request value downward on the basis that there is an expected wait time of 10 minutes after dropping the customer off at the drop-off location. As another example, the processor 302 may adjust one ride-hailing request value upward on the basis that it takes the operator to a drop-off location where future ride-hailing request values are higher based on the basis of higher fares in that area.

At 516, the method 500 may identify a shift end time. For example, the processor may receive information from the remote computing device 312 or the memory storage device 304 or input by the operator at the input device 308 that the operator's shift ends at 9:30 PM.

At 518, the method 500 may identify a shift end location. For example, the processor 302 may receive information from the remote computing device 312 or the memory storage device 304 or input by the operator at the input device 308 that the operator intends to end the shift at a specific address or travel to the specific address after the shift has been completed.

At 520, the method 500 may adjust the ride-hailing request values downward based on probability and extent of non-productive travel to the shift end location by the shift end time that accepting the initial ride-hailing requests would result in. For example, the processor 302 may estimate that accepting the second initial ride-hailing request would result in an operator, at the end of the operator's shift, having to travel to a home location for 15 miles taking an estimated 30 minutes, and then adjust the second ride-hailing request value downward on that basis.

At 522, the method 500 may identify a threshold ride-hailing request value. For example, the processor 302 may receive the threshold ride-hailing request value from the memory storage device 304 or the remote computing device 312. The processor 302 may receive the threshold ride-hailing request value from the input device 308.

At 524, the method 500 may determine whether the ride-hailing request values exceed the threshold ride-hailing request value. For example, the processor 302 may determine that a threshold value has been exceeded for a first ride-hailing request value, but not a second ride-hailing request value. The threshold value may be based on an operator preference. The threshold value may change based on location. The threshold value may change based on time of day or day of week. The threshold value may rise based on the number of initial ride-hailing requests available (in order to limit the amount of initial ride-hailing requests displayed, as discussed later).

At 526, the method 500 displays the initial ride-hailing requests and the ride-hailing request values. In some embodiments displaying the initial ride-hailing requests and the ride-hailing request values includes displaying the initial ride-hailing requests and the ride-hailing request values in an order based on the operator preferences. In some embodiments, displaying the initial ride-hailing requests and the ride-hailing request values includes displaying only the initial ride-hailing requests and the ride-hailing request values where the ride-hailing request values have been determined to exceed the threshold ride-hailing request value.

At 528, the method 500 may calculate probable shift end values based on the shift end time and the ride-hailing request values. For example, the processor 302 may calculate future ride-hailing request probabilities, determine future ride-hailing request values, and adjust the future ride-hailing request values. The processor 302 may then determine the first shift end value by extrapolating to the shift end time.

At 530, the method 500 may display the probable shift end values. For example, the processor 302 could instruct the display device 306 to show the shift end values next to the respective ride-hailing request values and initial ride-hailing requests.

In some embodiments, a method for providing ride-hailing recommendations to an operator includes receiving at least a first initial ride-hailing request and a second initial ride-hailing request from potential ride-hailing users. The method further includes identifying, for the first initial ride-hailing request, at least a first route characteristic corresponding to a first route associated with the first initial ride-hailing request. The method further includes identifying, for the second initial ride-hailing request, at least a second route characteristic corresponding to a second route associated with the second initial ride-hailing request. The method further includes calculating a first subsequent ride-hailing request probability based on a first drop-off location corresponding to the first initial ride-hailing request. The method further includes calculating a second subsequent ride-hailing request probability based on a second drop-off location corresponding to second initial ride-hailing request. The method further includes determining, for the first initial ride-hailing request, a first ride-hailing request value based on at least the first route characteristic and the first subsequent ride-hailing request probability. The method further includes determining, for the second initial ride-hailing request, a second ride-hailing request value based on at least the second route characteristic and the second subsequent ride-hailing request probability. The method further includes displaying the first and second initial ride-hailing requests and the first and second ride-hailing request values.

In some embodiments, the method can further include identifying a shift end time. In some embodiments, the method can further include estimating a first shift end value based on the shift end time and the first ride-hailing request value. In some embodiments, the method can further include estimating a second shift end value based on the shift end time and the second ride-hailing request value. In some embodiments, the method can further include displaying the estimated first and second shift end values. In some embodiments, the method can further include adjusting the first ride-hailing request value based on an estimated amount of non-productive travel associated with the first initial ride-hailing request. In some embodiments, the method can further include adjusting the second ride-hailing request values based on an estimated amount of non-productive travel associated with the second initial ride-hailing request. In some embodiments, the method can further include identifying, for the operator, at least one operator preference. In some embodiments, the method can further include adjusting the first and second ride-hailing request values based on the at least one operator preference. In some embodiments, the method can further include determining a display order of the first and second initial ride-hailing requests based on the at least one operator preference, wherein displaying the first and second initial ride-hailing requests and the first and second ride-hailing request values includes displaying the first and second initial ride-hailing requests and the first and second ride-hailing request values based on the display order. In some embodiments, the method can further include determining whether the first ride-hailing request value is greater than a threshold, wherein displaying the first initial ride-hailing request and the first ride-hailing value includes displaying the first initial ride-hailing request and the first ride-hailing value in response to the first initial ride-hailing request being greater than the threshold. In some embodiments, the route characteristics are selected from a group including current traffic conditions, future traffic conditions, road grade, speed limits, drop-off location, pick-up location, distance to pick-up location, distance between pick-up location and drop-off location.

In some embodiments, a system for presenting fare recommendations to a ride-hailing operator includes a processor, a display; and a memory including instructions that, when executed by the processor, cause the processor to receive initial ride-hailing requests from potential ride-hailing users. The instructions further cause the processor to identify, for the initial ride-hailing requests, routes and at least a respective one route characteristic associated with each of the initial ride-hailing requests. The instructions further cause the processor to determine ride-hailing request values for the initial ride-hailing requests based on the at least one route characteristic associated with each of the initial ride-hailing requests. The instructions further cause the processor to calculate wait times and future ride-hailing request values based on drop-off locations associated with the initial ride-hailing requests. The instructions further cause the processor to adjust the ride-hailing request values based on the wait times and future ride-hailing request values. The instructions further cause the processor to display the initial ride-hailing requests and the ride-hailing request values.

In some embodiments, the instructions further include identifying a shift end time. In some embodiments, the instructions further include calculating probable shift end values based on the shift end time and the ride-hailing request values. In some embodiments, the instructions further include displaying the probable shift end values. In some embodiments, the instructions further include identifying a shift end time and a shift end location. In some embodiments, the instructions further include adjusting the ride-hailing request values downward based on probability and extent of non-productive travel to the shift end location by the shift end time that accepting the initial ride-hailing requests would result in. In some embodiments, the instructions further include identifying a user account associated with the operator having operator preferences. In some embodiments, the instructions further include adjusting the ride-hailing request values based on the operator preferences. In some embodiments, the instructions further include identifying a user account associated with the operator having operator preferences. In some embodiments displaying the initial ride-hailing requests and the ride-hailing request values may include displaying the initial ride-hailing requests and the ride-hailing request values in an order based on the operator preferences. In some embodiments, the instructions further include identifying a threshold ride-hailing request value. In some embodiments, the instructions further include determining whether the ride-hailing request values exceed the threshold ride-hailing request value. In some embodiments, displaying the initial ride-hailing requests and the ride-hailing request values can include displaying only the initial ride-hailing requests and the ride-hailing request values where the ride-hailing request values have been determined to exceed the threshold ride-hailing request value. In some embodiments calculating wait times and future ride-hailing request values based on drop-off locations associated with the initial ride-hailing requests may include identifying customer density for the drop-off locations associated with the initial ride-hailing requests. In some embodiments calculating wait times and future ride-hailing request values based on drop-off locations associated with the initial ride-hailing requests may include adjusting the ride-hailing request values based on the customer density associated with the drop-off locations.

In some embodiments, a non-transitory computer-readable storage medium, comprising executable instructions that, when executed by a processor, facilitate performance of operations. The instructions include receiving initial ride-hailing requests from potential ride-hailing users. The instructions further include identifying, for the initial ride-hailing requests, routes and at least a respective one route characteristic associated with each of the initial ride-hailing requests. The instructions further include determining ride-hailing request values for the initial ride-hailing requests based on the at least one route characteristic associated with each of the initial ride-hailing requests. The instructions further include calculating wait times and future ride-hailing request values based on drop-off locations associated with the initial ride-hailing requests. The instructions further include adjusting the ride-hailing request values based on the wait times and future ride-hailing request values. The instructions further include displaying the initial ride-hailing requests and the ride-hailing request values.

In some embodiments, the instructions further include identifying a shift end time. In some embodiments, the instructions further include calculating probable shift end values based on the shift end time and the ride-hailing request values. In some embodiments, the instructions further include displaying the probable shift end values. In some embodiments, the instructions further include identifying a shift end time and a shift end location. In some embodiments, the instructions further include adjusting the ride-hailing request values downward based on probability and extent of non-productive travel to the shift end location by the shift end time that accepting the initial ride-hailing requests would result in. In some embodiments, the instructions further include identifying a user account associated with the operator having operator preferences. In some embodiments, the instructions further include adjusting the ride-hailing request values based on the operator preferences. In some embodiments, the instructions further include identifying a user account associated with the operator having operator preferences. In some embodiments displaying the initial ride-hailing requests and the ride-hailing request values may include displaying the initial ride-hailing requests and the ride-hailing request values in an order based on the operator preferences. In some embodiments, the instructions further include identifying a threshold ride-hailing request value. In some embodiments, the instructions further include determining whether the ride-hailing request values exceed the threshold ride-hailing request value. In some embodiments, displaying the initial ride-hailing requests and the ride-hailing request values may include displaying only the initial ride-hailing requests and the ride-hailing request values where the ride-hailing request values have been determined to exceed the threshold ride-hailing request value. In some embodiments, calculating wait times and future ride-hailing request values based on drop-off locations associated with the initial ride-hailing requests further includes identifying customer density for the drop-off locations associated with the initial ride-hailing requests. In some embodiments, calculating wait times and future ride-hailing request values based on drop-off locations associated with the initial ride-hailing requests further includes adjusting the ride-hailing request values based on the customer density associated with the drop-off locations.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for providing ride-hailing recommendations to an operator of a vehicle, the method comprising:
    receiving at least a first initial ride-hailing request and a second initial ride-hailing request from potential ride-hailing users;
    identifying, for the first initial ride-hailing request, at least a first route characteristic corresponding to a first route associated with the first initial ride-hailing request;
    determining a vehicle energy consumption profile for the vehicle based on historical data corresponding to at least one of the vehicle and at least one other vehicle, wherein the historical data indicates energy consumption of the at least one of the vehicle and the at least one other vehicle;
    identifying, for the second initial ride-hailing request, at least a second route characteristic corresponding to a second route associated with the second initial ride-hailing request;
    calculating a first subsequent ride-hailing request probability based on a first drop-off location corresponding to the first initial ride-hailing request;
    calculating a second subsequent ride-hailing request probability based on a second drop-off location corresponding to the second initial ride-hailing request;
    determining, for the first initial ride-hailing request, a first ride-hailing request value based on at least the first route characteristic, the first subsequent ride-hailing request probability, and a projected energy consumption of the vehicle, wherein the projected energy consumption is determined based on the vehicle energy consumption profile;
    determining, for the second initial ride-hailing request, a second ride-hailing request value based on at least the second route characteristic and the second subsequent ride-hailing request probability;
    displaying the first initial ride-hailing request, the second initial ride-hailing request, the first ride-hailing request value, and the second ride-hailing request value; and
    selectively controlling propulsion of the vehicle on one of the first route and the second route based on a target speed profile generated using the vehicle energy consumption profile.

2. The method of claim 1, further comprising:
    identifying a shift end time;
    estimating a first shift end value based on the shift end time and the first ride-hailing request value;
    estimating a second shift end value based on the shift end time and the second ride-hailing request value; and
    displaying the first shift end value and the second shift end value.

3. The method of claim 1, further comprising:
adjusting the first ride-hailing request value based on a first estimated amount of non-productive travel associated with the first initial ride-hailing request;
adjusting the second ride-hailing request value based on a second estimated amount of non-productive travel associated with the second initial ride-hailing request.

4. The method of claim 1, further comprising:
identifying, for the operator, at least one operator preference; and
adjusting the first ride-hailing request value and the second ride-hailing request value based on the at least one operator preference.

5. The method of claim 4, further comprising:
determining a display order of the first initial ride-hailing request and the second initial ride-hailing request based on the at least one operator preference, wherein displaying the first initial ride-hailing request and the second initial ride-hailing request and the first ride-hailing request value and the second ride-hailing request value includes displaying the first initial ride-hailing request, the second initial ride-hailing request, the first ride-hailing request value, and the second ride-hailing request value based on the display order.

6. The method of claim 1, further comprising:
determining whether the first ride-hailing request value is greater than a threshold, wherein displaying the first initial ride-hailing request and the first ride-hailing request value includes displaying the first initial ride-hailing request and the first ride-hailing request value in response to the first initial ride-hailing request being greater than the threshold.

7. The method of claim 1, wherein the first route characteristic and the second route characteristic are selected from a group comprising a current traffic condition, a future traffic condition, a road grade, a speed limit, a respective drop-off location, a respective pick-up location, a distance to the respective pick-up location, and a distance between the respective pick-up location and the respective drop-off location.

8. A system for presenting fare recommendations to a ride-hailing operator of a vehicle, the system comprising:
a processor;
a display; and
a memory including instructions that, when executed by the processor, cause the processor to:
receive initial ride-hailing requests from potential ride-hailing users;
identify, for the initial ride-hailing requests, routes and at least one route characteristic associated with each of the initial ride-hailing requests;
determine a vehicle energy consumption profile for the vehicle based on historical data corresponding to at least one of the vehicle and at least one other vehicle, wherein the historical data indicates energy consumption of the at least one of the vehicle and the at least one other vehicle;
determine ride-hailing request values for the initial ride-hailing requests based on the at least one route characteristic associated with each of the initial ride-hailing requests and a projected energy consumption of the vehicle, wherein the projected energy consumption is determined based on the vehicle energy consumption profile;
calculate wait times and future ride-hailing request values based on drop-off locations associated with the initial ride-hailing requests;
adjust the ride-hailing request values based on the wait times and the future ride-hailing request values;
present the initial ride-hailing requests and the ride-hailing request values on the display;
selectively control propulsion of the vehicle on one route associated with one ride-hailing request of the initial ride-hailing requests based on a target speed profile generated using the vehicle energy consumption profile.

9. The system of claim 8, wherein the instructions further include:
identifying a shift end time;
calculating probable shift end values based on the shift end time and the ride-hailing request values; and
displaying the probable shift end values.

10. The system of claim 8, wherein the instructions further include:
identifying a shift end time and a shift end location; and
adjusting the ride-hailing request values downward based on probability and extent of non-productive travel to the shift end location by the shift end time that accepting the initial ride-hailing requests would result in.

11. The system of claim 8, wherein the instructions further include:
identifying operator preferences associated with the operator; and
adjusting the ride-hailing request values based on the operator preferences.

12. The system of claim 8, wherein the instructions further include:
identifying operator preferences associated with the operator; and
wherein displaying the initial ride-hailing requests and the ride-hailing request values includes displaying the initial ride-hailing requests and the ride-hailing request values in an order based on the operator preferences.

13. The system of claim 8, wherein the instructions further include:
identifying a threshold ride-hailing request value; and
determining whether the ride-hailing request values exceed the threshold ride-hailing request value;
wherein displaying the initial ride-hailing requests and the ride-hailing request values includes displaying only the initial ride-hailing requests and the ride-hailing request values where the ride-hailing request values have been determined to exceed the threshold ride-hailing request value.

14. The system of claim 8, wherein calculating the wait times and the future ride-hailing request values based on the drop-off locations associated with the initial ride-hailing requests includes:
identifying customer density for the drop-off locations associated with the initial ride-hailing requests; and
adjusting the ride-hailing request values based on a customer density associated with the drop-off locations.

15. A non-transitory computer-readable storage medium, comprising instructions that, when executed by a processor, facilitate performance of operations, comprising:
receiving, for a vehicle, initial ride-hailing requests from potential ride-hailing users;
identifying, for the initial ride-hailing requests, routes and at least one route characteristic associated with each of the initial ride-hailing requests;
determining a vehicle energy consumption profile for the vehicle based on historical data corresponding to at least one of the vehicle and at least one other vehicle, wherein the historical data indicates energy consumption of the at least one of the vehicle and the at least one other vehicle;

determining ride-hailing request values for the initial ride-hailing requests based on the at least one route characteristic associated with each of the initial ride-hailing requests and a projected energy consumption of the vehicle, wherein the projected energy consumption is determined based on the vehicle energy consumption profile;

calculating wait times and future ride-hailing request values based on drop-off locations associated with the initial ride-hailing requests;

adjusting the ride-hailing request values based on the wait times and future ride-hailing request values;

displaying the initial ride-hailing requests and the ride-hailing request values; and selectively controlling propulsion of the vehicle on one route associated with one ride-hailing request of the initial ride-hailing requests based on a target speed profile generated using the vehicle energy consumption profile.

16. The non-transitory computer-readable storage medium of claim 15, wherein the instructions further include:

identifying a shift end time;

calculating probable shift end values based on the shift end time and the ride-hailing request values; and displaying the probable shift end values.

17. The non-transitory computer-readable storage medium of claim 15, wherein the instructions further include:

identifying a shift end time and a shift end location; and adjusting the ride-hailing request values downward based on probability and extent of non-productive travel to the shift end location by the shift end time that accepting the initial ride-hailing requests would result in.

18. The non-transitory computer-readable storage medium of claim 15, wherein the instructions further include:

identifying a user account associated with an operator having operator preferences; and adjusting the ride-hailing request values based on the operator preferences.

19. The non-transitory computer-readable storage medium of claim 15, wherein the instructions further include:

identifying a user account associated with an operator having operator preferences; and wherein displaying the initial ride-hailing requests and the ride-hailing request values includes displaying the initial ride-hailing requests and the ride-hailing request values in an order based on the operator preferences.

20. The non-transitory computer-readable storage medium of claim 15, wherein the instructions further include:

identifying a threshold ride-hailing request value; and determining whether the ride-hailing request values exceed the threshold ride-hailing request value;

wherein displaying the initial ride-hailing requests and the ride-hailing request values includes displaying only the initial ride-hailing requests and the ride-hailing request values where the ride-hailing request values have been determined to exceed the threshold ride-hailing request value.

* * * * *